Dec. 22, 1964     M. I. COHN ETAL     3,162,379
METHOD FOR DELAMINATING SIZED LAMINAR MINERAL PARTICLES
Original Filed Dec. 22, 1958                4 Sheets-Sheet 1

INVENTORS
MORRIS I. COHN
ROY D. PERDUE
BY
*Dike, Thompson & Bronstein*
ATTORNEYS Dec. 22, 1964 M. I. COHN ETAL 3,162,379
METHOD FOR DELAMINATING SIZED LAMINAR MINERAL PARTICLES
Original Filed Dec. 22, 1958 4 Sheets-Sheet 2

INVENTORS
MORRIS I. COHN
ROY D. PERDUE
BY
*Dike, Thompson & Bronstein*
ATTORNEYS

INVENTORS
MORRIS I. COHN
ROY D. PERDUE
BY
Dike, Thompson & Bronstein
ATTORNEYS

Dec. 22, 1964  M. I. COHN ETAL  3,162,379
METHOD FOR DELAMINATING SIZED LAMINAR MINERAL PARTICLES
Original Filed Dec. 22, 1958  4 Sheets-Sheet 4

FIG. 10

INVENTORS
MORRIS I. COHN
ROY D. PERDUE
BY
Dike, Thompson & Bronstein
ATTORNEYS

United States Patent Office 3,162,379
Patented Dec. 22, 1964

3,162,379
METHOD FOR DELAMINATING SIZED LAMINAR MINERAL PARTICLES
Morris I. Cohn, Needham, and Roy D. Perdue, Tewksbury, Mass., assignors to Mineral Industries Corporation of America, Needham, Mass., a corporation of Massachusetts
Continuation of applications Ser. Nos. 197,812 and 197,813, May 17, 1962; said application Ser. No. 197,813 being a continuation of application Ser. No. 189,933, Apr. 24, 1962, which is a continuation of application Ser. No. 782,992, Dec. 22, 1958. This application Oct. 14, 1963, Ser. No. 316,187
13 Claims. (Cl. 241—4)

The present invention relates to a method of any apparatus for grinding and delaminating mica, especially mica derived from mica schist ores.

Mica is found in nature in the form of schist, pegmatite, alaskite and other deposits. Some schist deposits contain as much as 60% or higher mica by weight. Pegmatite ores, now being commercially worked, seldom yield higher than 10% mica from the total rock mined. The former are soft, consist of small particles of mica dispersed throughout the rock and are easily worked by open pit mining techniques. The latter occur in hard rock as veins and are inherently more difficult to mine. Schist deposits therefore are attractive sources of mica if the delaminated ground product derived therefrom could meet the specifications of the mica consuming industries. However, prior to the present invention, no commercially successful method has been found to grind schist mica to obtain a mica product which is acceptable commercially in spite of the fact that many attempts have been made to do so.

Mica occurs in nature as clusters of laminated sheets called blocks or books. In schist, these books are quite small, perhaps ¼ to ⅛ inch across and smaller and are dispersed throughout the rock. On the other hand, mica books from conventional pegmatite veins may run several inches in one or more dimensions. Mica derived from pegmatite deposits can be delaminated and ground by several well known wet and dry processes to yield fine particles having a plate-like structure. It is this plate-like or flaky shape that mainly accounts for the utility of ground mica. Mica derived from alaskite deposits (in the mining of feldspar) also lends itself to conventional delaminating and grinding techniques yielding fine flakes. On the other hand, schist mica and mica from other sources containing a large percentage of fines have always been difficult to delaminate and grind to sufficient fineness while still preserving a plate-like particle shape. In other words, it is difficult to delaminate the small books of mica in schist and other mica products containing the same and reduce the delaminated sheets to flakes of proper fineness without destroying the plate-like structure of the mica. With most conventional grinding techniques, the ground particles obtained from schist mica and other mica containing a large percentage of fines are not sufficiently flaky and consequently the resulting product is commercially unsatisfactory. It is believed that the reason for this is that the small books are ground as such into smaller books without delamination occurring.

The paint industry, wallboard-joint cement manufacturers, and other high tonnage consumers of ground mica have established particle size and bulk density specifications, among others, in order to control the quality of the mica being used in their products. It has been found that the bulk density, i.e. the actual weight of ground mica contained in a given fluffed or riffled volume thereof (pounds per cubic foot), correlates well with the flakiness and fineness of the individual particles. The more flakes present in a sample, i.e. the greater the degree of delamination, the greater the percentage of voids and thus the lower the bulk density. The lower the bulk density and the finer the flakes, the higher the quality of the product. The bulk densities of undelaminated mica ground and unground and of ground mica, the plate-like shape of which has been destroyed, are relatively high.

The best and more costly ground mica products obtained from dry and wet grinding methods have bulk densities of 10 to 14 lbs. per cubic foot. Of these products, the finer grinds having particles of dimensions less than 44 microns (minus 325 mesh) command the higher selling prices.

No commercially satisfactory, instantaneous and continuous method of grinding a true schist mica and other mica products containing a large percentage of fines to low bulk densities 10–14 pounds per cubic foot and lower) and fine particle size has been known prior to this invention. Batch type wet mulling as practiced in water ground mica manufacture will delaminate schist mica, but this method is unattractive because of the long time cycles and high overall cost.

An object of the present invention is to provide for the first time an economical, commercially feasible, instantaneous and continuous method of delaminating and grinding schist mica and other mica products containing a high percentage of fines into fine, flaky particles without destroying the plate-like structure of the mica, to produce a fine, flaky mica product having a sufficiently low bulk density and sufficient flakiness and fineness to meet the most exacting standards of the mica consuming industries. While primarily designed for schist mica, the delaminating and grinding method of the present invention provides an economical, instantaneous and continuous method for grinding conventional scrap or book mica derived from pegmatite, alaskite and other mica deposits or from mica trimmings and splittings to the necessary particle size and bulk density specifications required for the more costly ground mica products.

A further object of this invention is to provide a commercially feasible, economical, instantaneous and continuous method of delaminating and grinding mica, which in addition to having the advantages above referred to, can accommodate, as feed, mica books of fine size which heretofore had to be discarded.

A still further object is to provide an improved method of delaminating and grinding mica.

A still further object is to provide an apparatus for carrying out the above-mentioned method.

The method of the present invention comprises applying a high fluid pressure on a liquid slurry of mica books or blocks to force it to flow at a high velocity through a highly-restricted opening in the nature of a fraction of an inch formed by closely spaced hard surfaces designed to impart shearing, turbulence, shattering, impact, and cavitation forces on the mica books to delaminate and grind them into fine flakes. The slurry is discharged from the opening at a high velocity against a hard impact surface directly in front of the opening. In a preferred embodiment, the restricted opening comprises a valve opening and the slurry under high pressure is directed against the valve to force it slightly away from its seat against the force of resilient means such as a spring or the like yieldingly urging it toward its seat, whereby the slurry under pressure is forced at an extremely high velocity through the highly restricted opening between the valve and its seat and against the impact surface. The direction of flow of the slurry through the valve opening is at an angle to the direction of flow to the valve, and the opening is preferably annular in shape.

Preferably, the valve is rotated to prevent the slurry from wearing a channel in the valve seat and to cause the wear effects of the slurry on the valve and valve seat to be more uniform whereby the useful life of the valve and valve seat before overhaul and repair becomes necessary is substantially increased.

The fluid pressure can be generated by a suitable pressure pump such as a piston pump operating on the slurry.

The valve, mounted on the pump discharge, can be any one of several designs such as that used for the high pressure homogenizing of milk.

The impact surface can be provided by an impact ring around the annular valve opening and within a fraction of an inch therefrom, as is customary with valves of this design. The ring forms with the outside of the valve a passage of restricted cross section extending at an angle to the valve opening and through which the slurry flows after impacting against the ring.

A valve assembly such as that known as a Gaulin Single Stage Homogenizing Valve Assembly is suitable. However, valves of similar and modified design providing like action can be used within the scope of this invention.

Fluid pressure can be generated by any means which will develop sufficiently high pressures. The use of a multiple piston pump is hereinafter cited as a convenient method, but vertical head pipes, accumulators, pumps of alternate design and the like could also be employed as pressure sources.

An aqueous slurry is particularly suitable because of the low cost and availability of water and because the usual steps employed in removing non-micaceous minerals from the ore normally require water. However, any liquid which does not detrimentally affect the mica can be used.

The invention will be more clearly understood from the following description in conjunction with the accompanying drawings, in which.

Before explaining in detail the present invention it is to be understood that the invention is not limited in its application to the details and arrangements illustrated and described herein, since the invention is capable of other embodiments and of being practiced or carried out in various ways. Also, the terminology employed and the theories described herein are for the purposes of description and explanation and not of limitation and it is not intended to limit the invention claimed herein beyond the requirements of the prior art.

With reference to the drawings, the mica ore (schist, pegmatite or alaskite or other mica deposits) is first crushed into small particles in a conventional ore crushing mechanism 1. Garnet and heavy minerals, if present, are then removed from the crushed ore in a mechanism 2 conventionally used for that purpose. Silica and other remaining non-micaceous minerals are then removed from the mica in a conventional froth flotation unit or other mica concentrator utilizing water and suitable flotation reagents, if necessary. The mica and water discharged from flotation unit 3 flow to the mica slurry feed tank 4 to which additional water is added to obtain the desired concentration of mica in water. The mica and water are agitated in tank 4 by agitator 5 to produce a uniform aqueous mica slurry which is fed by gravity or a pump to the inlet 7 of liquid piston pump 10 of the pressure pump and valve assembly 12. The slurry is sucked from inlet 7 through suction ball check valve 13 of pump 10 into the pump cylinder 14 by the suction stroke of piston 16 and is forced through discharge ball check valve 18 to and through the high pressure pump outlet 20 into the high pressure inlet passage or chamber 22 of the valve assembly 23 and against valve 24 which is urged toward valve seat 26 by a heavy spring 33. The high pressure exerted on the valve 24 by the slurry in the confined passage 22 forces the valve slightly away (a fraction of an inch) from its seat 26, whereby the slurry under pressure flows at an extremely high velocity through the highly restricted valve opening 28 against an annular impact ring 30 extending around the valve. The slurry then flows through the narrow passage 29 between the ring 30 and the adjacent outer peripheral walls of the valve and seat. Delamination and grinding are achieved by the shearing effect on the mica particles of the closely spaced valve seat 26 and valve face 31 forming opening 28 and of the closely spaced impact ring 30 and outer peripheries of the valve and valve seat forming passage 29, all of which are made of a very hard material such as tungsten carbide, by the turbulence and cavitation of the mica particles as they flow through opening 28 against impact ring 30 and through passage 29 and by shattering and impact of the particles against the impact ring 30 and valve face 31. The various changes in direction of flow of the slurry from 22 to 28 and from 28 to 29 also contribute to the delaminating and grinding phenomena. It is believed that the liquid media contributes to the effectiveness of the delaminating and grinding forces.

It is also believed that the restricted valve opening 28 functions to flow orient the mica particles with the planar surfaces thereof aligned in the direction of flow through the opening so that they are discharged from the opening and hit the impact ring edgewise. This belief is supported by the fact that initially with a new impact ring the impact surface immediately opposite the discharge of the opening develops a very finely etched hair-line groove and by the fact that the postage stamp-shaped mica particles in the finished product have two dimensions (planar dimensions) which are greater than the size $d$ of the opening and the width of the hair-line groove.

The slurry containing the delaminated ground mica flows from pressure pump and valve assembly 12 to a second pressure pump and valve assembly 32 of the same construction as 12 and in which the mica is further delaminated and ground. The delaminated mica flows from 32 to a conventional screen or classifier 34 in which the mica particles which are coarser than desired in the final end product are removed. The second pump and valve assembly 32 can be omitted in which case the mica slurry flows from 12 directly to 34. The mica slurry containing fine mica flakes flows from 34 to a conventional centrifuge 36 where the bulk of the water is removed and may be recycled back to the slurry feed tank 4. The mica particles are then dried in a conventional dryer 38 and the dried mica is passed to a conventional deagglomerator 40 in which any agglomerates formed during centrifuging and drying are broken up. The finished product is discharged from the deagglomerator 40 and comprises fine mica flakes of low bulk density and top quality.

Figures 3, 4, 5, 6:
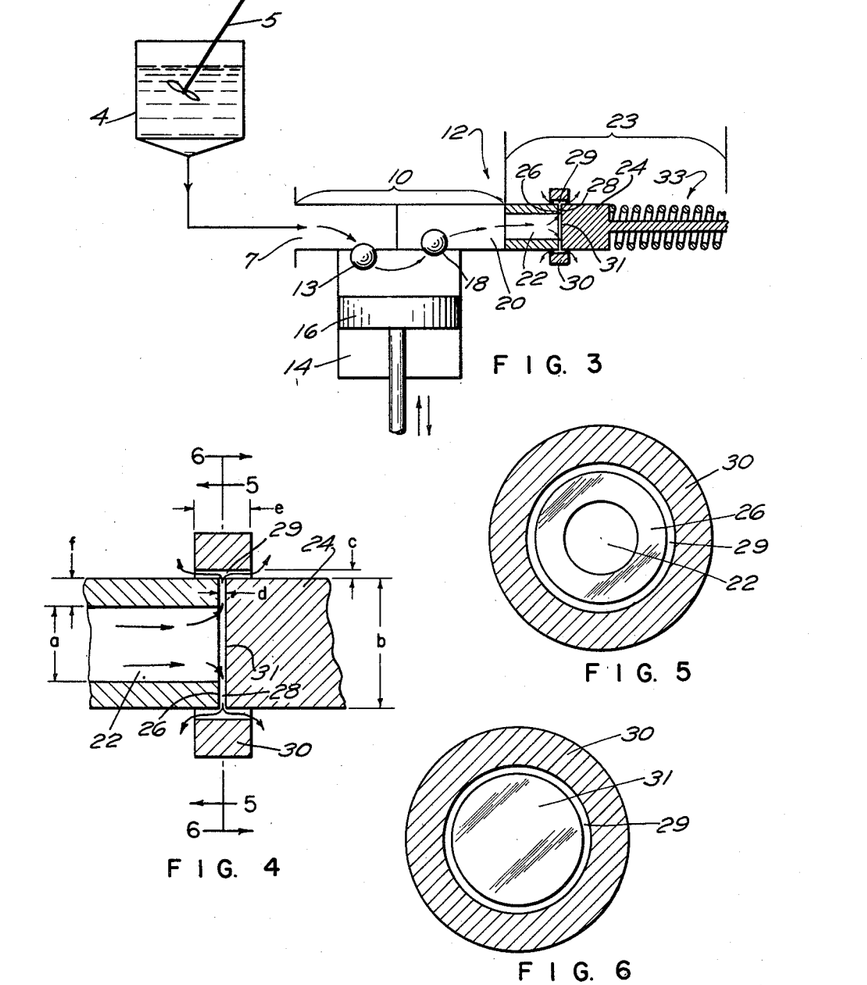
FIG. 3 is a diagrammatic view of the mica slurry tank and the pump and valve assembly of FIG. 1.
FIG. 4 is an enlarged view of the valve of FIG. 3.
FIG. 5 is a view taken along the line 5—5 of FIG. 4.
FIG. 6 is a view taken along the line 6—6 of FIG. 4.

The flow described above is continuous and the delamination and grinding of the mica occurs instantaneously as it passes through aperture 28, strikes ring 30 and passes through passage 29. In the particular valve assembly 23 shown in the drawings, the diameter $a$ (see FIG. 4) of the bore forming valve inlet 22 is 0.1877 inch, the diameter $b$ of the valve 24 is 0.375 inch, the distance $c$ between the impact ring 30 and the outer peripheral surfaces of the valve 24 and seat 26 is .032 inch, the distance $d$ between the valve face 31 and the valve seat 26 (width of opening 28) is between .001 and .005 inch, the width $e$ of impact ring 30 is .2848 inch and the thickness $f$ of valve seat 26 (distance of travel of slurry while between the valve and seat) is .0935 inch. The spring 33 is of sufficient weight and is compressed sufficiently to exert, when flow through the assembly is 0, a closing force on the valve which is slightly less than the force exerted on the valve by the liquid slurry which is under a pressure of about 6,000 pounds per square inch so that, during flow of slurry through the valve assembly, the valve 24 is forced a fraction of an inch away from the seat 26 by a slight compression of spring 33 to form the annular opening 28 through which the slurry flows at a velocity of about 540 feet per second from high pressure area 22 to the low pressure (substantially atmospheric) area outside the valve. The above-mentioned specific dimensions, pressure and velocity are given by way of example only and it is not intended that the invention be limited thereto.

Figure 2:
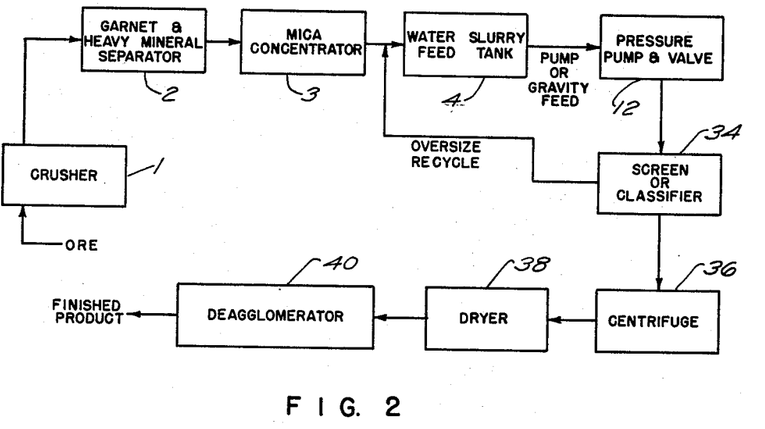
FIG. 2 is a flow diagram corresponding to FIG. 1 but showing the oversized particles discharged from the valve being recycled back to the slurry feed tank.

It is advantageous to recycle the coarse mica particles separated from the fines at screen 34 from the screen back to the slurry feed tank 4 as shown in FIG. 2.

The slurry feed tank 4 can be any tank fitted with an agitator designed to keep the mica books in uniform suspension. The screen or classifier 34 can be any of a variety of rotating or vibrating screens capable of handling slurries or any other type of wet classifier such as a rake classifier. The centrifuge 36 can be a perforate bowl type fitted with a suitable filter media or a solid bowl type. The dryer 38 can be of conventional design for removal of water from the centrifuge cake. The deagglomerator 40 can be any kind of device, such as a hammer mill, which will break up the dried mica. This mica sometimes cakes into hard lumps as it passes through the dryer and normally needs only a slight impact to reduce the lumps and restore the mica to loose particles. Although an annular valve opening 28 is shown in the drawings and is preferred, a fixed or adjustable aperture of any kind and shape can be used in conjunction with an impact surface in front of the aperture discharge.

As indicated above, the individual sheets of mica within the books are separated and reduced to fine particle size by shearing, turbulence, shattering, impact and cavitation forces as the slurry of books is forced under pressure through the restricted opening 28 of the valve at extremely high velocities and is impacted against the ring 30 and flows through passage 29. The effectiveness of this phenomenon in producing fine, flaky, platelike particles has been found to depend on the following variables:

| No. | Variable |
| --- | --- |
| 1 | Weight percent concentration of mica in the slurry. |
| 2 | Particle size range of the mica books, or the average particle size of the books. |
| 3 | Pressure developed by the pump or head device. |
| 4 | The number of times that the slurry is subjected to the phenomenon, hereinafter called the number of passes. |
| 5 | The removal of fine particles as soon as they have been produced and recycling of the coarser particles back to the slurry feed tank. |

1. CONCENTRATION

Holding the other variables constant, the lower the concentration of mica books in the slurry, the lower the bulk density of the resulting product. The concentration can be as high as can be handled in the pressure producing device so long as the slurry is flowable and can be as low as is desired. By flowable it is meant that a mass of the slurry will change its shape under the influence of gravity when the mass is initially placed on a stationary horizontal surface. Concentrations from ½ percent to 50 percent have been used, but 1 percent to 30 percent are preferred. The effect of varying concentration is demonstrated by Example 1 below.

2. PARTICLE SIZE RANGE OR AVERAGE PARTICLE SIZE

Holding the other variables constant, the larger the average particle size, the lower the bulk density of the resulting product. While an absence of exceedingly fine books has been found to give a better product, the method of the present invention can be used no matter how fine the average particle size may be by adjusting the concentration downward (see Example 1 below and discussion of Variable No. 1 above) and by recycling the coarser particles removed at screen 34 (see Example 5 and discussion of Variable No. 5 below). Particles are limited in maximum size only by the capabilities of the pumping or pressure producing device and the internal dimensions of the valve, particularly, between the valve face 31 and the valve seat face 26. To this extent, the particles in the feed may be considered as being sized particles, i.e. they are not substantially greater in size than the above-mentioned maximum size which can be handled by the valve without plugging it to thereby render it inoperative. In practice, a particle just passing a 20 mesh screen can be easily handled. If a piston pump is used, the larger the pump, the larger the particles which can be handled. The effect of varying particle size is demonstrated by Example 2 below.

3. SLURRY PRESSURE

Holding the other variables constant, the higher the slurry pressure, the lower the bulk density of the resulting product. Pressures as high as 12,000 pounds per square inch have been used successfully. The maximum pressure is dictated only by the limitations and capabilities of currently available equipment. Some pumps presently available can develop 20,000 pounds per square inch and higher. As a practical matter, the upper limit is consistent with good product quality without undue equipment maintenance and wear and the lower limit is not the lowest pressure at which the phenomenon can be detected, but rather represents a point below which other variables must be adjusted to such a point as to make the process lose its commercial advantage. About 250 pounds per square inch may be considered as a practical lower limit, although with certain soft mica deposits some delamination may occur at pressures as low as about 100 pounds per square inch. Originally, pressures from about 1,500 pounds per square inch to 6,000 pounds per square inch were studied and more recently, pressures from about 500 and 600 pounds per square inch to 6,000 pounds per square inch have been used successfully and are presently the most practical. All pressures referred to hereinbefore and hereinafter are gage pressures. The effect of varying pressure is demonstrated by Example 3 below.

4. NUMBER OF PASSES

Holding all other variables constant, the greater the number of passes, the lower the bulk density of the resulting product. The effect of increasing the number of passes is demonstrated by Example 4 below.

5. REMOVAL OF FINE PARTICLES AND RECYCLING COARSER PARTICLES

It has been found that by passing the slurry through the valve, removing the desired fine mica flakes by wet screening or the like, recycling the oversize material and adding raw mica and water to restore the concentration, a lower bulk density and higher conversion to fine flaky particles can be obtained than without recycling of the oversize material.

The size $d$ of the valve opening 28 depends upon the compression of the spring 33 and the fluid pressure on the slurry. Opening sizes in the nature of between about .001 and .005 inch (less than .010 inch) are typical. The lower limit is dictated only by practical considerations. Opening sizes greater than about .090 inch require such a high pumping rate or such a small dimension $a$ (FIG. 4) to achieve adequate velocities through opening 28 that they are not commercially practical. In fact, opening sizes greater than about .050 inch are difficult to use, although with certain soft mica deposits and under certain conditions, some delamination may occur with opening sizes as large as about 0.10 inch.

The velocity of the slurry through the opening 28 depends on the size of the opening, the fluid pressure, the force exerted by the spring 33, the capacity of the pump volumetric delivery) and the magnitude of dimension $a$. Velocities in the nature of about 540 feet per second and greater, including sonic velocities, can be used. Maximum velocities are dictated only by practical considerations and limitations of available equipment. Velocities between about 300 feet per second and 1,000 feet per second are preferred. With most mica concentrates, the delaminating phenomena decreases rapidly below about 250 feet per second, although with certain soft mica deposits, delamination may occur at velocities as low as about 100 feet per second.

The rate of feed of slurry to the pressure pump 10 is not critical and can be as low as 15 gallons per hour and as high as 3,000 gallons per hour and more depending on the capacities of the pump 10 and valve 23.

Slurry pressures and velocities developed at the valve are regulated by the compression of spring 33. By compressing the spring more, a higher pressure is developed to force the slurry through the spring loaded valve, the opening 28 becomes more restricted and the slurry velocity increases. The maximum spring force is dictated by maximum pressures and velocities which in turn are dictated by limitations of currently available equipment. The minimum spring force is dictated only by the minimum pressures, velocities and valve opening sizes at which substantial delamination occurs.

Although a spring 33 is shown urging the valve 24 toward closed position, any other resilient, yieldable means can be used such as a pneumatic or hydraulic motor or block of elastic material such as a hard rubber material.

The distance $c$ of the impact ring 30 from the adjacent peripheral surfaces of the valve and seat is important. The smaller it is, the better the results. However, it must be large enough to accommodate the discharge from opening 28. The delaminating effects decreases rapidly at distances greater than about 0.25 inch. A distance $c$ of less than about 0.10 inch is preferred.

*Examples*

The range of efficiencies and performance which can be obtained by varying the above Variables 1 to 5 are manifold. The following examples are meant to support the preceding statements and in no way are intended to limit the scope of the invention.

The mica feed for the following examples, with the exception of Example 6, was obtained from the Gassetts Schist located in Chester, Vermont. The schist was crushed and ground in 1 to pass a 20 mesh screen. The garnets and heavy minerals were removed in 2. The mica was separated from silica and other non-micaceous minerals by froth flotation in 3. A particle size analysis of the resulting mica concentrate is as follows:

| Mesh: | Percent |
|---|---|
| Minus 20 plus 30 | 0.62 |
| Minus 30 plus 40 | 3.78 |
| Minus 40 plus 60 | 15.8 |
| Minus 60 plus 100 | [1]19.0 |
| Minus 100 plus 200 | 31.9 |
| Minus 200 plus 325 | 14.9 |
| Minus 325 on pan | 14.0 |
| | 100.0 |

[1] Bulk density: 48–52 lbs. per cu. ft.

In each example, the whole or a fraction (as indicated) of the mica discharged from froth flotation apparatus 3 was passed to 4 where an aqueous slurry of proper concentration (as indicated in the examples) was made and then flowed through the various units as described above and shown in flow diagrams 1 and 2. In Examples 1 to 4, flow was according to FIG. 1 except that in run 1 of Example 4 the pressure pump and valve assembly 32 was omitted. In Example 5, steps 2 to 5, the flow was according to FIG. 2, whereas in step 1 the flow was according to FIG. 1 with the exception that +325 mesh particles separated from the slurry in 34 were recycled from 34 to 4. In Example 6, flow was according to FIG. 1.

EXAMPLE 1.—EFFECT OF VARYING CONCENTRATION OF SLURRY

Figure 1:
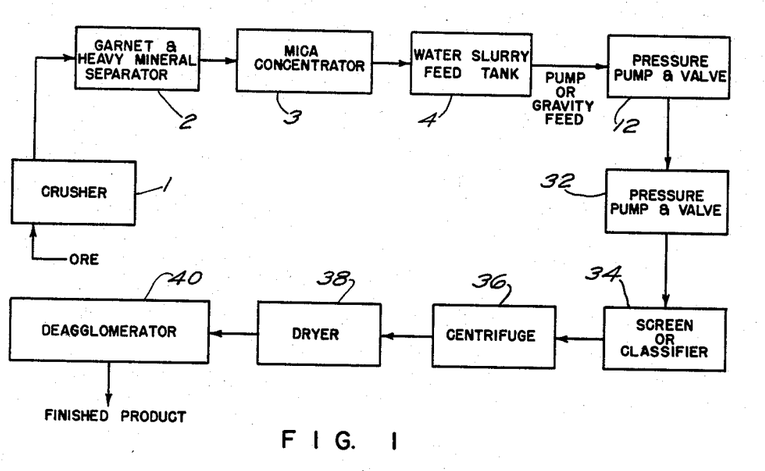
FIG. 1 is a flow diagram of the method of the present invention with the various units designated as boxes.

Feed to 4: −60 plus 200 mesh fraction of mica concentrate discharged from 3 and described above
Rate of slurry feed to 12: 15 gallons per hour
Fluid pressure in 12 and 32: 6,000 pounds per square inch
Number of passes: 2 (two pressure pump and valve assemblies 12 and 32 in series as shown in Fig. 1)
Removal of fine particles between passes: None

| Run No. | Concentration of mica in water slurry, percent by weight | Bulk density of minus 325 mesh fraction, lbs./cu. ft., removed from 40 |
|---|---|---|
| 1 | 10 | 11.5 |
| 2 | 15 | 12.4 |
| 3 | 20 | 13.0 |

EXAMPLE 2.—EFFECT OF VARYING AVERAGE PARTICLE SIZE OF MICA FEED

Pressure in 12 and 32: 6,000 pounds per square inch
Number of passes: 2
Removal of fine particles between passes: None
Concentration: 10% by weight
Same rate of slurry feed as Example 1

| Run No. | Feed description | Bulk density of minus 325 mesh fraction, lbs./cu. ft., removed from 40 |
|---|---|---|
| 1 | Fraction of mica concentrate discharged from 3, minus 100 mesh only. | 16.4 |
| 2 | Fraction of mica concentrate discharged from 3, plus 100 mesh only. | 12.1 |

EXAMPLE 3.—EFFECT OF VARYING PRESSURE IN 12 AND 32

Feed: Schist mica concentrate as discharged from mica concentrator 3
Rate of slurry feed: Same as Example 1
Number of passes: 2
Removal of fine particles between passes: None
Concentration: 5% by weight

| Run No. | Pressure Lbs./Sq. Inch | Bulk Density of Minus 60 Mesh Fraction, Lbs./Cu. Ft., Removed from 40 |
|---|---|---|
| 1 | 1,500 | 24.6 |
| 2 | 3,000 | 19.2 |
| 3 | 6,000 | 15.8 |

EXAMPLE 4.—EFFECT OF VARYING NUMBER OF PASSES

Feed: Schist mica concentrate as discharged from mica concentrator 3
Rate of slurry feed: Same as Example 1
Removal of fine particles between passes: None
Concentration: 5% by weight
Pressure: 6,000 pounds per square inch

| Run No. | Number of Passes | Bulk Density of Minus 60 Mesh Fraction, Lbs./Cu. Ft., Removed from 40 |
|---|---|---|
| 1 | 1 | 20.3 |
| 2 | 2 | 15.8 |

EXAMPLE 5.—REMOVAL OF FINE PARTICLES (−325 MESH) WITH RECYCLING OF COARSER PARTICLES (+325 MESH)

Feed: Schist concentrate as discharged from mica concentrator 3
Rate of slurry feed: Same as Example 1
Concentration: 20% by weight
Pressure: 6,000 pounds per square inch

| Step No. | Recycle, Parts | Raw Feed, Parts | Water, Parts | Bulk Density of Minus 325 Mesh Fraction, Lbs./Cu. Ft. | Remarks |
|---|---|---|---|---|---|
| 1 | 0 | 200 | 800 | 19.5 | 2 passes. |
| 2 | 66.5 | 133.5 | 800 | 14.7 | 1 pass. |
| 3 | 137.0 | 62.3 | 800 | 12.5 | 1 pass. |
| 4 | 145.9 | 54.1 | 800 | 12.4 | 1 pass. |
| 5 | 151.4 | 48.6 | 800 | 13.0 | 1 pass. |

NOTE.—Conversion of approximately 25% of total material handled per pass to −325 mesh low density mica is obtained after stabilization.

The initial 200 parts of feed to 12 was all raw feed. 133.5 parts of the discharge from 32 was −325 mesh and continued on to 40. 66.5 parts were +325 mesh and were recycled back to 4 and 133.5 parts of raw feed were added to bring the total feed back to 200 parts. Sufficient water was added to provide a 20% concentration. The neew feed was fed to 12 and then directly to 34 as shown in FIG. 2. 62.3 parts were −325 mesh and were passed on to 40. 137 parts were +325 mesh and were recycled. This increase in the amount of +325 mesh discharged from 12 was due to the fact that only one pass was used in step 2 and the fact that the new feed with the recycled mica contained more coarse particles than the original feed. 62.3 parts of raw feed were added to the recycled feed to bring the total back to 200 parts and enough water was added to obtain a 20% by weight concentration and the new feed of step No. 3 was fed to 12. Thereafter, the amount of −325 mesh particles produced stayed at about 25% of the feed and the amount of recycled +325 mesh particles stayed at about 75% of the total feed. Thus, conditions became stabilized after the first step and bulk densities of between 12 and 13 pounds per cubic foot were continuously obtained (discharged from 40) from raw feed having a bulk density of 48–52 pounds per cubic foot continuously fed to 4.

EXAMPLE 6

A sample of conventional mica scrap (not schist) having a particle size analysis as follows was used in another run (fed to 4) under the following conditions:

| Mesh: | Percent |
|---|---|
| On 20 | Trace |
| Minus 20 plus 30 | Trace |
| Minus 30 plus 40 | 2.8 |
| Minus 40 plus 60 | [1] 44.0 |
| Minus 60 plus 100 | 43.3 |
| Minus 100 plus 200 | 6.0 |
| Minus 200 plus 325 | 1.6 |
| Minus 325 on pan | 2.3 |
| | 100.0 |

[1] Bulk density: 20.0 lbs./cu. ft.

Rate of aqueous slurry feed: Same as in Example 1
Pressure in 32: 6,000 pounds per square inch
Pressure in 12: 2,000 pounds per square inch
Number of passes: 2 (12 and 32)
Removal of fine particles between passes: None
Concentration: 10% by weight in water
Bulk density of minus 325 mesh fraction removed from 40: 9.55 lbs./cu. ft.
Percent converted to −325 mesh: 38.6%

In accordance with the present invention, mica having bulk densities less than about 7 or 8 pounds per cubic foot and as low as about 3 and 4 pounds per cubic foot and having a fineness of much less than −325 mesh can be produced efficiently, economically and continuously. Mica having such low bulk densities has never before been produced.

Densities of about 3 and 4 pounds per cubic foot were obtained with the use of the conditions of Example 1 but with 4 passes, a rate of slurry feed to 12 of 120 gallons per hour, a fluid pressure of 3000 pounds per square inch and a concentration of 1% and with a North Carolina mica scrap having the following particle size analysis as feed:

| Mesh: | Percent |
|---|---|
| Plus 20 mesh | 1.5 |
| Minus 20 plus 30 | 3.3 |
| Minus 30 plus 40 | [1] 8.1 |
| Minus 40 plus 60 | 23.0 |
| Minus 60 plus 100 | 26.8 |
| Minus 100 | 37.3 |
| | 100.0 |

[1] Initial bulk density: 28–30 lbs. per cut. ft.

The abrasive action of the mica slurry on the surfaces 26 and 31 of the valve seat and valve respectively, produces the following wear effects on such surfaces after the valve assembly has been operated for a period of time.

Figures 7, 8, 9:
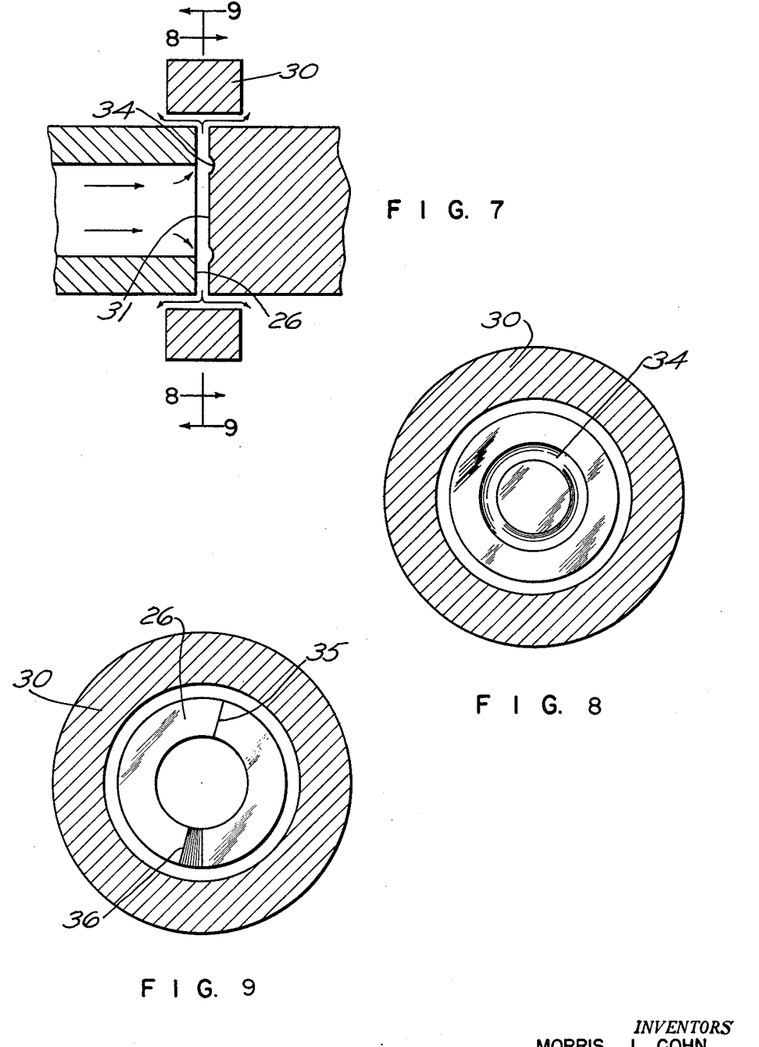
FIG. 7 is a view like FIG. 4 showing the effect on the parts of the abrasive action of the mica slurry after the valve assembly has been in use for some time.
FIG. 8 is a view taken along the line 8—8 of FIG. 7.
FIG. 9 is a view taken along the line 9—9 of FIG. 7.

Referring to FIGS. 7 and 8, at the ring shaped area 34 on the valve face 31 where the mica slurry changes direction and is simultaneously accelerated by the decreased cross sectional area as it enters the restricted opening 28, a ring shaped area of wear 34 slowly develops. This ring shaped area develops into a ring shaped groove 34 which destroys or alters the working surface 31 of the valve and thereby prevents the achievement of a proper uniform clearance $d$ between the surfaces 26 and 31. As a result the quality and uniformity of the resulting delaminated mica deteriorates. Simultaneously as the ring shaped groove 34 develops on valve face 31 an area of wear develops on the valve seat surface 26. This area of wear is either in the form of a fine line 35 or wide channel 36, as shown in FIG. 9. The former is typical of softer valve material; the latter is typical of harder valve material such as tungsten carbide. The mica slurry flow tends to channel through these channular areas of wear 35 and 36, thereby reducing velocity and shear effects on the mica particles and making pressure control and the achievement of proper slurry velocities difficult or impossible. This prevents proper delamination and grinding and consequently causes the quality and uniformity of the resulting delaminated mica to deteriorate.

To remedy these wear effects, it is necessary to remove the valve seat 26 and valve 24 from the valve assembly 23 and have the surfaces 26 and 31 relapped and polished by conventional machine shop practice.

It has been found that the formation of channels 35 and 36 can be substantially reduced or eliminated and that the groove 34 will develop more uniformly by rotating the valve about its longitudinal axis.

Figure 10:
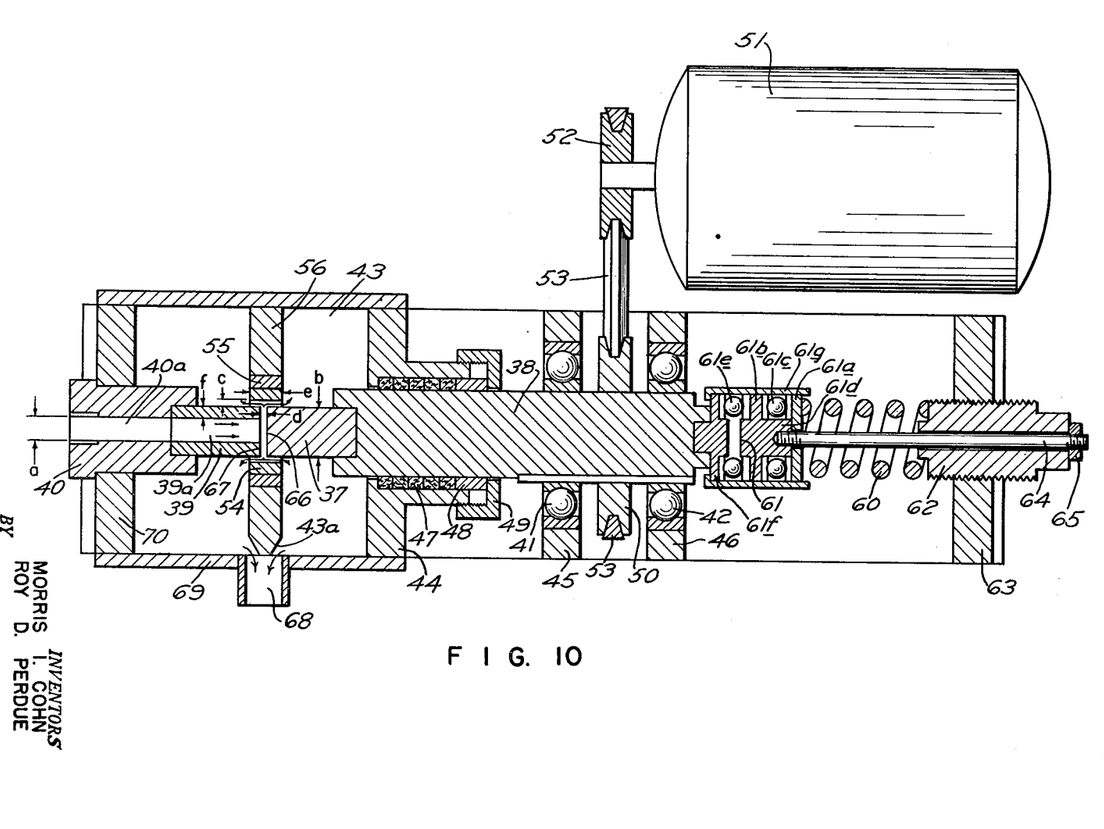
FIG. 10 is a section in elevation of another embodiment of a valve assembly for carrying out the method of the present invention and having a mechanism for rotating the valve surface with which the mica slurry comes in contact to reduce harmful wear effects of the slurry on the valve and valve seat.

A device in which the valve is so rotated and which is sufficiently rugged in design to operate satisfactorily at production rates of several tons per hour of fine, delaminated mica from a coarse and abrasive mineral slurry, is shown in FIG. 10. The valve 37 has the same cross sectional shape and dimension as valve 24 in FIGS. 3 to 6 and is rotated by a rotating shaft 38 to one end of which the valve 37 is anchored by means of a press or interference fit of the end of the valve in a recess in the end of the shaft.

The shaft 38 is supported by two radial package type bearings 41 and 42 equipped with dust and grease seals and enters the fluid chamber 43 through a stuffing box 44. The radial bearings 41 and 42 are press fitted into the radial bearing supports 45 and 46. The stuffing box 44 prevents leakage of water and mineral particles along the outer periphery of shaft 38 by means of several rings of packing 47, a packing follower 48 and a packing compression nut 49.

Rotating motion is imparted to the shaft 38 by means of a pulley 50 which is keyed to the shaft 38. The pulley 50 is driven by a motor 51, pulley 52 and V-belt 53.

The cylindrical valve seat 39 has the same cross sectional shape and dimensions as valve seat 26 in FIGS. 3 to 6 and is supported in position by a cylindrical valve seat holder 40 into which an end thereof is anchored by means of a press or interference fit. Valve seat holder 40 is supported in an aperture in the end wall 70 of fluid chamber 43. The valve seat 39 and valve seat holder 40 are hollow and have axially aligned internal bores 39a and 40a respectively which have the same cross sectional shape and internal diameter as high pressure inlet passage or chamber 22 in FIGS. 3 to 6 and into which mica slurry under pressure is pumped from pump 10.

The impact ring 54 has the same shape and dimensions as impact ring 30 in FIGS. 3 to 6 and is held by means of a press fit in the impact ring holder 55 which in turn is supported and properly positioned by a wall 56, which is supported by the wall 69 of chamber 43. The peripheral portion of wall 56 adjacent outlet 68 of the chamber 43 is bevelled at 43a to permit the mica slurry to flow from the chamber 43 on both sides of wall 56 into outlet 68.

The valve 37 is urged axially toward the valve seat surface 67 of valve seat 39 by the action of a compression spring 60 acting on the end of shaft 38 in an axial direction through a thrust bearing assembly 61. The thrust bearing assembly 61 permits the shaft 38 to rotate while being urged to the left, as shown in FIG. 10, by the stationary spring 60.

Thrust bearing assembly 61 comprises a plate 61a which is urged to the left as viewed in FIG. 10 by spring 60. Plate 61a acts on plate 61b through ball bearings 61c and through the engagement of plate 61a with hub 61d of plate 61b to urge plate 61b to the left. Plate 61b acts on shaft 38 to urge it to the left through ball bearings 61e and plate 61f affixed to the end of the shaft. The plates and ball bearings of thrust bearing assembly 61 are housed within a free floating housing 61g which is prevented from rotation but which is free to move longitudinally. Any conventional thrust bearing assembly can be used.

The amount of force delivered by the spring 60 can be adjusted by means of compression adjustment plug 62. The plug 62 is threaded in a supporting wall 63 and has a hollow passage in which spring rod 64 is loosely fitted. One end of rod 64 is threaded into hub 61d and the rod is loosely fitted in an aperture in plate 61a.

Rotating the plug 62 in one direction so that it moves axially to the left as viewed in FIG. 10 increases the spring force exerted on the valve 37. Rotating the plug in the other direction so that it moves axially to the right decreases the spring force exerted on the valve 37. Continued movement to the right of plug 62 is finally transferred through nut 65 and the spring rod 64 to plate 61b to release the spring force on the valve 37 so that the unit can be disassembled.

The slight axial movement of shaft 38 and valve 37 between closed position of the valve and maximum open position is not enough to interfere with the pulley drive 50, 52 and 53.

The parts of the valve assembly subject to the most severe conditions, i.e. the valve 37, the valve seat 39, and the impact ring 54, are best made of the hardest obtainable materials such as tungsten carbide. Because of the high cost of these materials, the apparatus shown in FIG. 10 is designed so that these parts are of minimum size and can be replaced if necessary.

The dimensions a, b, c, d, e, and f in the valve assembly of FIG. 10 are substantially the same as the corresponding dimensions in the valve assembly in FIGS. 3 to 6, it being understood that the invention is not limited to such dimensions.

The rotating motion of the valve surface 66 with respect to both the valve seat surface 67 and the impact surface of impact ring 54 causes the slurry therebetween to impact a constant lapping and polishing action on such surfaces which prevents the formation of channels 35, 36 in surface 67 as shown in FIG. 9. The surface 67 and the portion of surface 66 facing surface 67 wear uniformly and the equipment can be operated until the groove 34 (FIG. 8) becomes so deep as to cause striking of the ungrooved peripheral portion of surface 66 against surface 67. When the surfaces begin to strike, the valve can be disassembled and the surfaces 66 and 67 can be relapped and polished by conventional machine shop practice.

Valve 37 can be rotated as slowly as 0.5 revolution per minute (r.p.m.) and as fast as 3540 r.p.m. or more. Speeds of conventional motors, as for example 1750 r.p.m., are satisfactory. However, 600–800 r.p.m. is a preferred range and can be achieved through the proper selection of motor 51 and the pulleys 50 and 52.

The rotary motion imparted to valve face 66 may be oscillatory.

Flow through the valve assembly of FIG. 10 should be adequate to assure a layer of slurry between the surfaces 66 and 67, which layer of slurry provides a constant lapping action on the surfaces and prevents the surfaces from rubbing against each other. For example, with a valve seat 39 having an internal diameter $a$ of 0.250 inch a flow of about four gallons per minute (g.p.m.) or more is adequate.

The fluid chamber 43 can be formed by a cylindrical wall 69 or a series of flat walls, such as a box, and is closed at the ends by plate or wall 70, which supports the valve seat holder 40, and the stuffing box 44.

With reference to FIG. 10, mineral slurry under pressure from the pump 10 passes through the bores 40a and 39a in the valve seat holder 40 and valve seat 39 respectively against the rotating valve 37 to force surface 66 away from surface 67 against the force exerted on the valve by spring 60, to thereby provide restricted opening $d$ between surfaces 66 and 67 through which opening the slurry flows at a high velocity against the impact ring 54, into fluid chamber 43 and out of the fluid chamber 43 through outlet 68 to another pump and valve assembly or to the classifier 34.

The method of the present invention can be used to delaminate and grind any mineral which occurs in the form of laminated layers such as sericite, talc and other so-called platy minerals. The word mica as used herein includes sericite. See A Glossary of the Mining and Mineral Industry, by Albert H. Lay, Department of the Interior Bulletin 95, page 603.

Talc having a bulk density of 15 pounds per cubic foot and less, i.e. as low as six pounds per cubic foot, has been produced with the use of the method of the present invention.

Although in the above-described method the mica slurry discharged from the valve opening is directed against an impact surface, with certain soft deposits of mica and talc, the impact ring can be omitted, in which case, delamination is accomplished by passage through the valve opening only.

This application is a continuation of our applications Serial Nos. 197,813 and 197,812, both filed May 17, 1962, and both now abandoned. This application discloses only subject matter disclosed in said application Serial No. 197,813, which is a continuation of application Serial No. 189,933, filed April 24, 1962, now abandoned, which in turn is a continuation of our application Serial No. 782,-992, filed December 22, 1958, now abandoned, which is in turn a continuation-in-part of our application Serial No. 758,930, filed September 4, 1958, now abandoned.

We claim:

1. A method of delaminating sized laminar, mineral particles selected from the group consisting of mica particles and talc particles, said method comprising forcing a flowable liquid slurry of said mineral particles in the form of a thin film edgewise through a thin, hard surfaced gap under a high pressure of at least 250 pounds per square inch and at an extremely high velocity by virtue of reduction of said higher pressure to a substantially lower pressure to separate the layers of said laminar mineral particles.

2. A method according to claim 1, said pressure forcing said gap to open to provide said flow of slurry therethrough against a yieldable force tending to close said gap.

3. A method according to claim 2, the major portion of said particles having a particle size greater than about 200 mesh.

4. A method according to claim 2, said film having a maximum thickness of about 0.09 inch and moving through said gap in a direction at an angle to the direction of flow to the gap, said pressure being at least about 600 pounds per square inch.

5. A method of delaminating sized laminar, mineral particles selected from the group consisting of mica particles and talc particles to reduce the bulk density thereof, said method comprising forcing a flowable liquid slurry of said mineral particles in the form of a thin film edgewise through a thin, hard surfaced gap under a high pressure of at least 250 pounds per square inch and at an extremely high velocity by virtue of reduction of said higher pressure to a substantially lower pressure against a hard impact surface to separate the layers of said laminar mineral particles and reduce the bulk density thereof.

6. A method of delaminating sized laminar mica mineral particles, said method comprising forcing a flowable liquid slurry of said mica mineral particles in the form of a thin film edgewise through a thin, hard surfaced gap under a high pressure of at least 250 pounds per square inch and at an extremely high velocity by virtue of reduction of said high pressure to a substantially lower pressure against a hard impact surface to separate the layers of said laminar mica mineral particles.

7. A method according to claim 6, the major portion of said particles having a particle size greater than about 200 mesh.

8. A method according to claim 6, said film having a maximum thickness of about 0.09 inch and moving through said gap in a direction at an angle to the direction of flow to the gap, said pressure being at least about 600 pounds per square inch.

9. A method according to claim 6, said slurry being an aqueous slurry.

10. A method according to claim 6, said pressure forcing said gap to open to provide said flow of slurry therethrough against a yieldable force tending to close said gap.

11. A method according to claim 10, the major portion of said particles having a particle size greater than about 200 mesh.

12. A method according to claim 10, said slurry being an aqueous slurry.

13. A method according to claim 10, said film having a maximum thickness of about 0.09 inch and moving through said gap in a direction at an angle to the direction of flow to the gap, said pressure being at least about 600 pounds per square inch.

References Cited in the file of this patent

UNITED STATES PATENTS

| | | |
|---|---|---|
| 1,654,268 | Nielsen | Dec. 27, 1927 |
| 1,739,360 | Hopkins | Dec. 10, 1929 |
| 1,934,637 | Rafton | Nov. 7, 1933 |

UNITED STATES PATENT OFFICE
CERTIFICATE OF CORRECTION

Patent No. 3,162,379 December 22, 1964

Morris I. Cohn et al.

It is hereby certified that error appears in the above numbered patent requiring correction and that the said Letters Patent should read as corrected below.

Column 1, line 15, for "any" read -- and --; column 2, line 17, for "10-14" read -- (10-14 --; column 7, line 47, for "effects" read -- effect --; same column 7, in the table, lines 65 to 75, for "$^1$19.0" read -- 19.0 --, and "$^1$Bulk" read -- Bulk --; column 9, line 26, for "neew" read -- new --; same column 9, in the table, lines 50 to 60, for "$^1$44.0" read -- 44.0 --, and "$^1$Bulk" read -- Bulk --; column 10, in the table, lines 10 to 20, for "18.1" read -- 8.1 --, and "$^1$Initial" read -- Initial --.

(SEAL)         Signed and sealed this 3rd day of August 1965.

Attest:

ERNEST W. SWIDER                               EDWARD J. BRENNER
Attesting Officer                                 Commissioner of Patents